United States Patent [19]

Schiller

[11] 4,293,884
[45] Oct. 6, 1981

[54] MULTIPLE LEG MAGNETIC TRANSDUCER STRUCTURE

[75] Inventor: Edward Schiller, Sunnyvale, Calif.

[73] Assignee: Ampex Corporation, Redwood City, Calif.

[21] Appl. No.: 106,792

[22] Filed: Dec. 26, 1979

[51] Int. Cl.³ .................... G11B 5/12; G11B 5/27; G11B 5/105

[52] U.S. Cl. .................... 360/121; 360/125; 360/129

[58] Field of Search .................... 360/121, 125–127, 360/129, 62, 123

[56] References Cited

U.S. PATENT DOCUMENTS

| | | | |
|---|---|---|---|
| 2,756,280 | 7/1956 | Rettinger | 360/129 |
| 3,311,711 | 3/1967 | Maryatt et al. | 360/125 |
| 3,761,641 | 9/1973 | Mlinaric | 360/125 |
| 3,763,329 | 10/1973 | Linke | 360/121 |
| 3,843,968 | 10/1974 | Kroon | 360/125 |

Primary Examiner—Alfred H. Eddleman
Attorney, Agent, or Firm—Robert G. Clay; Elizabeth E. Strnad

[57] ABSTRACT

A multiple leg magnetic transducer has two corresponding core portions abutting at a transducing gap plane. Each portion has a transducing gap defining pole and a multiple leg back core contiguous with the pole. A nonmagnetic side piece supports the pole and intermediate leg portions while a rear leg portion most distant from the pole is unsupported by the side piece. The thusly supported portions are pressed together in a direction towards the transducing gap plane while the rear leg portions flex in the opposite direction to obtain an intimate contact between all corresponding end faces of the abutting core portions. In the preferred embodiment the flexed leg portions are firmly supported by a bonding material.

18 Claims, 6 Drawing Figures

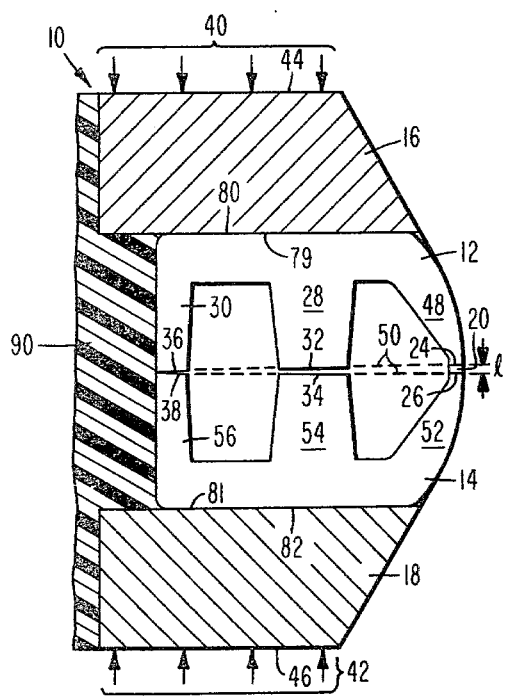
FIG_1 (PRIOR ART)
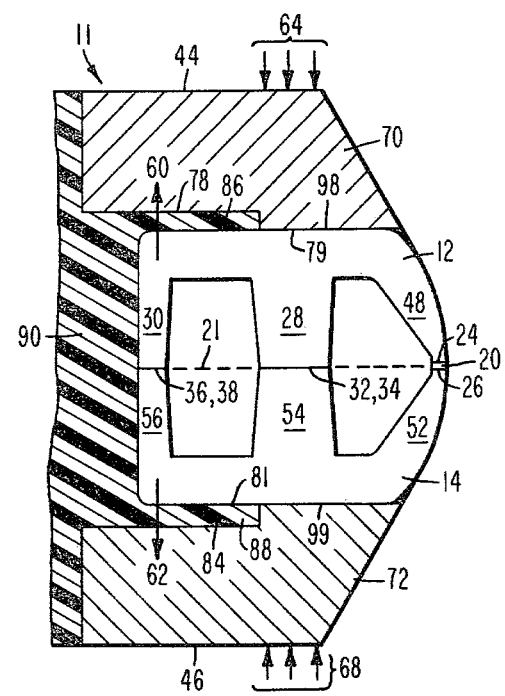
FIG_2
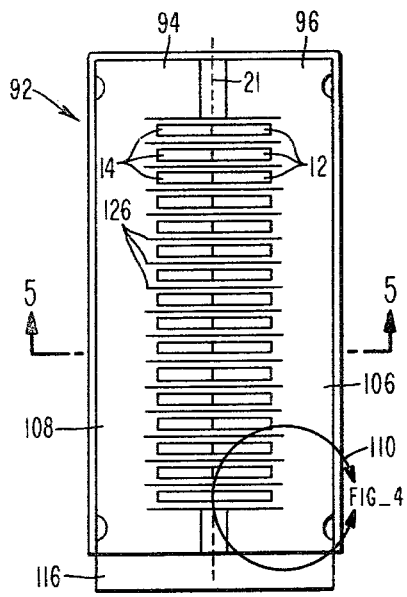
FIG_3
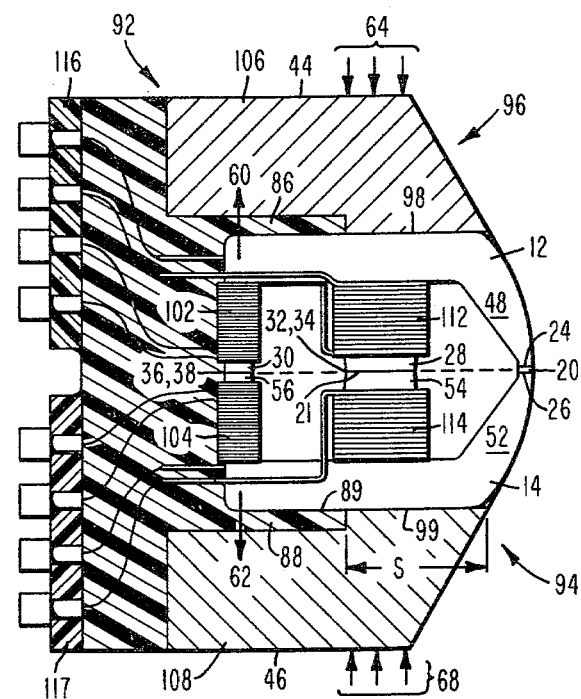
FIG_5
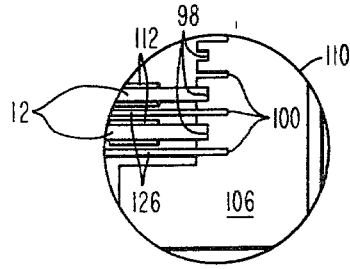
FIG_4

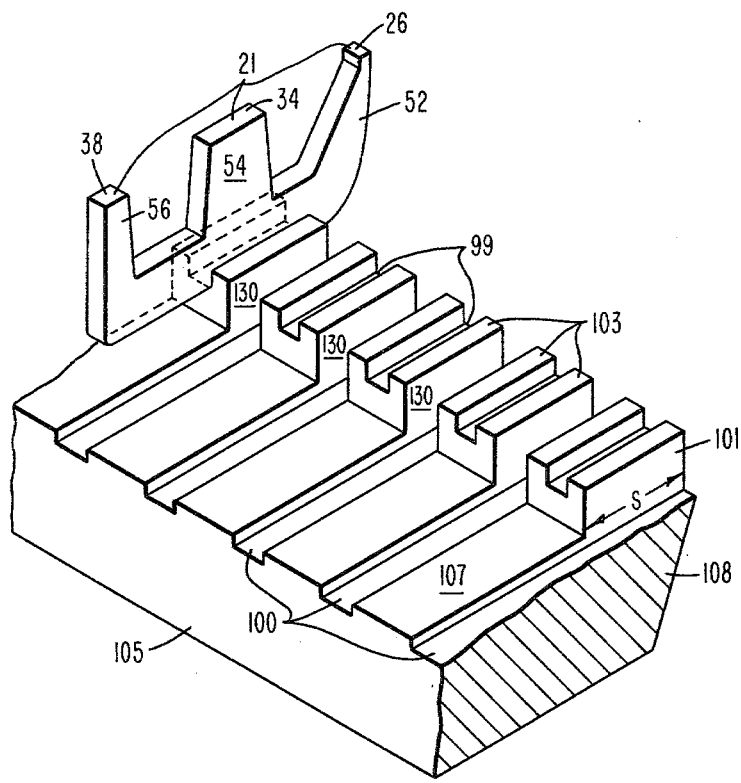
FIG_6

MULTIPLE LEG MAGNETIC TRANSDUCER STRUCTURE

BACKGROUND OF THE INVENTION

The invention relates to a magnetic transducer having poles defining a transducing gap and a multiple leg back core contiguous with the poles, and particularly to an improved core supporting structure, for use in magnetic recording/reproducing applications requiring zero spacing between the back core legs.

Magnetic transducers with multiple legs are known, for example, from the U.S. Pat. No. 3,881,194, assigned to Ampex Corporation, assignee of this patent application. The patent describes a transducer which may be utilized for recording or playback and which may be electromagnetically switched for use in one of these operating modes.

In that prior art transducer pole pieces defining a transducing gap are attached to a multiple leg back core. Each leg defines a separate flux path. One embodiment described in the patent has two back core legs, one for recording and the other one for playback. The patent discloses electromagnetic means for preventing flow of magnetic flux through that leg which is not in use during a particular selected operating mode. However, the above-indicated patent does not describe a structure for supporting the multiple leg transducer core.

It is well known that for obtaining an efficient magnetic transducer having optimum recording and reproducing characteristics, it is necessary to provide a precisely defined transducing gap while maintaining the reluctance of the rest of the flux path to minimum. The above features are generally obtained by providing a rigid transducer supporting structure in which the magnetic core members are pressed together to abut at the transducing gap, by applying a pressure sufficient for closing the transducing gap and maintaining it closed under both manufacturing and operational stresses. Such applied pressure is also utilized to minimize any additional gaps which may be provided for example for constructional reasons, such as a back core gap, to reduce unwanted fringing flux.

To that effect, conventional magnetic transducers are known to utilize magnetic core holders in the form of two corresponding side pieces made of nonmagnetic material into which corresponding transducer core portions are inserted. The side pieces are brought together in a confronting relationship at the transducing gap plane and clamped under mechanical pressure to force confronting end faces of the respective core portions to abut in precise registration. The assembly under pressure is known to be bonded together, for example, by epoxy resin. As it is well known in the art, during and following the bonding operation, a uniform controlled mechanical pressure is maintained to hold and force the core portions together while the resin hardens and sets. The result is an integrally joined rigid unitary transducer structure.

It has been observed that when such corresponding side pieces as described above are utilized for supporting a multiple leg transducer, undesirable gaps are formed in the transducer structure, thus reducing transducer efficiency as it will be described below.

FIG. 1 schematically represents a cross sectional view of a prior art transducer assembly 10. The transducer core has two corresponding core portions 12, 14. Each core portion 12, 14 is supported by a side piece 16, 18, respectively. The transducing gap 20 is formed between abutting end faces 24, 26 of corresponding magnetic poles 48, 52. It will be understood that the length "l" of the transducing gap is exaggerated in the drawings for illustration purposes. The core portions 12, 14 are assembled with corresponding poles 48, 52 and leg portions 28, 54 and 30, 56 in registration and with respective end faces 24, 26; 32, 34; and 36, 38; abutting. As it is well known in the art, during manufacturing of this type of transducers a controlled pressure indicated by arrows 40, 42 is applied to the corresponding side pieces 16, 18 and the respective transducer elements 12, 14, 16 and 18 are bonded together under that pressure by a suitable bonding material 90, such as epoxy resin. After the bonding process is completed, the externally applied pressure is removed. However, the core portions 12, 14 remain pressed together by the surrounding bonding material thus forming a rigid transducer structure having a well defined transducing gap, suitable to withstand operational stresses. It will be noted that the bonding material 90 has been deleted in the drawing from the inner portions of the core 12, 14 for clarity.

It has been observed that when pressing together the multiple leg core portions as indicated in FIG. 1, a wedge 50 is formed between the respective abutting end faces 24, 26; 32, 34; and 36, 38; respectively, due to the non-zero thickness "l" of the transducing gap material. Consequently, the intermediate leg portions 28, 54 remain substantially open during final assembly and thus in the resulting transducer structure due to the above-indicated wedge 50. The rear leg portions 30, 56 also remain open due to wedge 50 even though to a lesser extent since only a point contact is formed between the corresponding end faces 36, 38. For example, when intermediate leg portions 28, 54 are utilized for recording and rear leg portions 30, 56 for playback, such as described in the above-indicated U.S. Pat. No. 3,881,194, the recording leg 28, 54 will exhibit a relatively large gap while the playback leg 30, 56 will have a gap of a relatively smaller length. Consequently, the transducer efficiency will be reduced in both operating modes.

When utilizing the above-described type of multiple leg transducer structure in a multichannel transducer such as for longitudinal tape recording, the disadvantages related to insufficient closure of the respective multiple leg gaps are even more pronounced. As it is well known, in multichannel transducers it is desirable to have precisely uniform electrical characteristics of all the recording and reproducing channels, respectively. It has been found that when applying a uniform controlled pressure along the opposite sides of a multichannel transducer having a multiple leg back core, as shown in FIG. 1, the above-described wedge effects non-uniform gaps in both the recording and playback channels of the transducer, due to slight differences in physical dimensions of the respective elements forming these channels. For example, in a 16, 24 or 48-channel transducer of that type, there are significant differences between the channel-to-channel recording and reproducing characteristics, respectively, due to minute mechanical tolerances between individual channels of the transducer.

If the applied pressure is increased in an effort to obtain better closure of the unwanted gaps, a resulting excessive pressure may change the magnetic characteristics of the core or physically damage and eventually destroy the core.

SUMMARY OF THE INVENTION

Consequently, it is an object of the invention to provide a transducer assembly having a multiple leg back core and being supported by a nonmagnetic holder, where undesirable gaps between the respective back core legs are eliminated.

It is another object of the invention to provide a transducer having a back core with multiple legs, and comprising two corresponding core portions supported by corresponding nonmagnetic side pieces, where the core portions are pressed together to eliminate unwanted gaps between abutting end faces of the back core legs.

It is a further object to provide a multichannel transducer assembly having a plurality of magnetic cores with multiple legs where the cores are made of a generally flexible material, each core comprising two corresponding core portions symmetrical with respect to the transducing gap plane, in which assembly unwanted gaps between the multiple legs are eliminated to obtain uniform channel-to-channel characteristics.

In accordance with the invention, a magnetic transducer has two corresponding core portions made of a generally flexible magnetic material. Each core portion comprises a transducing gap defining pole and at least two leg portions contiguous with the pole. Each pole and leg portion has a smoothly lapped end face defining a transducing gap plane. A nonmagnetic supporting core holder is provided having two corresponding side pieces. Each side piece supports a magnetic core portion at the pole and intermediate leg portions. The rear leg portion which is most distant from the pole is not supported by the side piece. The corresponding magnetic core portions are held in juxtaposition with corresponding end faces in registration at the gap plane. A gap material is provided between the poles. The core portions are pressed together at the supported poles and intermediate leg portions to abut at the gap plane. The leg portions not supported by the holder flex in a direction opposite to the applied pressure. As a result, precisely closed gaps between the end faces of the poles and of all the respective leg portions are obtained.

The foregoing and other objects, features and advantages of the invention will become apparent from the following description and accompanying drawings.

BRIEF DESCRIPTION OF THE DRAWINGS

FIG. 1 is a simplified representation of a cross-sectional view of a prior art magnetic transducer;

FIG. 2 is a simplified representation of a cross-sectional view of a transducer in accordance with the invention;

FIG. 3 is a front elevation view of a multichannel magnetic transducer assembly in accordance with the invention;

FIG. 4 is an enlarged fragmentary view of a portion of the multichannel transducer assembly shown in FIG. 3;

FIG. 5 is an enlarged cross-sectional view of the multichannel transducer assembly of FIG. 3 taken along line 5—5 thereof; and FIG. 6 is a fragmentary perspective view schematically representing a portion of the side piece with grooves for supporting magnetic cores and shields.

DETAILED DESCRIPTION

To facilitate comparison, similar elements shown in the various figures of the drawings will be designated by like reference numerals.

FIG. 2 shows a simplified cross-sectional view of a transducer assembly 11 in accordance with the preferred embodiment of the invention. The transducer assembly 11 comprises two corresponding half-assemblies abutting at the plane 21 of the transducing gap 20. Each half assembly comprises a magnetic core portion 12, 14 substantially shaped as an E core. Each core portion 12, 14 has a magnetic pole 48, 52, an intermediate leg portion 28, 54, contiguous with the pole and a rear leg portion 30, 56, respectively. In the preferred embodiment the corresponding core portions 12, 14 as well as corresponding side pieces 70, 72 are of similar design respectively, and are assembled symmetrically with respect to the gap plane 21. A sufficiently flexible magnetic material is utilized for the core portions 12, 14 since extremely hard and brittle materials may easily crack under the pressure applied during manufacturing and operation, as it will follow from further description. In the preferred embodiment of the invention the magnetic core portions 12 and 14 are each made of a laminated material, for example etched or stamped of mumetal to obtain 1 mil thick laminations as it is well known in the art. Mumetal has been selected with respect to its flexibility and high permeability features. The obtained laminations are then superposed and bonded with epoxy to obtain laminated core portions 12, 14, respectively, of a width corresponding to a desired track width, as it is well known.

The side pieces 70, 72 are formed preferably of readily machinable non-magnetic material, such as aluminum or brass. Precisely matched grooves 98, 99 are machined in the corresponding side pieces 70, 72, respectively, for receiving core portions 12, 14. The core portions 12, 14 are fixedly mounted in the corresponding grooves in precise registration, for example, by epoxy or glass bonding, as well known.

From FIG. 1 it can be seen that grooves 80, 82 of the prior art side pieces 16, 18 support the entire lateral surfaces 79, 81 of the magnetic core portions 12, 14, respectively. Distinctly from the prior art and in accordance with the teachings of the invention FIG. 2 shows side pieces 70, 72 having core supporting grooves 98, 99 extending adjacent to the poles 48, 52 and intermediate leg portions 28, 54, while the rear leg portions 30, 56 which are distant from the poles 48, 52 are unsupported by the side pieces.

Consequently, when pressure is applied during transducer assembly and thereafter against the respective core portions 48, 28 and 52, 54 supported by the side pieces, as shown in FIG. 2 by arrows 64, 68, the unsupported leg portions 30, 56 are allowed to flex in respective directions 60, 62, substantially opposite to the applied pressure 64, 68. Flexing of the rear leg portions 30, 56 in turn allows the end faces 36, 38 and 32, 34 to move closer together, in an intimate mated relationship thus eliminating the previously described wedge 50 shown in FIG. 1.

It will be appreciated that even when core portions 12, 14 in the preferred embodiment of FIG. 2 are supported by a relatively shorter length of side pieces 70, 72 when comparing with the prior art transducer of FIG. 1, the transducer rigidity is not impaired since by bonding the transducer elements with a bonding material such as an epoxy filler, an extremely firm structure results, in which the flexed rear leg portions are firmly supported by that bonding material. It will be understood that a filler 90 is shown in FIGS. 2 and 5 in recessed areas 86, 88 of the side pieces 70, 72, while it is intentionally deleted from the inner portions of the transducer assembly for better clarity. For better clarity of representation also the transducing coils have been deleted from FIGS. 1 and 2. Such coils are placed in the preferred embodiment around each back core leg portion 28, 54 and 30, 56 respectively, as it will be described with reference to FIG. 5. If the transducer of FIG. 2 is utilized, for example, for recording and playback operating modes alternatively and electromagnetic means are employed to select one of these modes, as disclosed in the above-indicated U.S. Pat. No. 3,881,194, then it is preferable to place a recording winding around leg portions 28, 54 and a reproduce winding around leg portions 30, 56, respectively.

Now a preferred embodiment of a multichannel transducing assembly in accordance with the invention will be described with reference to FIGS. 3 to 6, such as utilized in longitudinal tape recorders. The multichannel transducer assembly 92 comprises two corresponding half assemblies 94, 96, abutting at a transducing gap plane 21, as shown in FIG. 3. Each half assembly comprises a side piece 106, 108, made preferably of a readily machinable, nonmagnetic material, such as aluminum or brass. The latter materials have an additional advantage of excellent electric shielding properties as is well known in the art. The side pieces 106, 108 each have a plurality of corresponding parallel core slots 98, 99 and a plurality of corresponding shield slots 100 formed therein, as shown in FIG. 4. A plurality of magnetic core portions 12, 14, with transducing windings 102, 104, 112, 114 thereon, as shown in FIG. 5, are secured in the core slots 98, 99. Shield slots 100 serve to accommodate electromagnetic shields 126 as shown in FIGS. 3 and 4, however, not shown in FIG. 6 for better clarity. The shields 126 are arranged between adjacent cores and spaced apart therefrom to prevent interchannel crosstalk, as it is known in the art.

The magnetic core portions 12, 14 correspond to those previously described with respect to FIG. 2; therefore, they will not be described here to avoid repetition.

Since in the preferred embodiment of the invention both side pieces 106, 108 of the multichannel transducer structure 92 are of similar design, only one side piece 106 or 108 is shown in FIGS. 4 and 6, respectively. As it is seen from FIG. 6, side piece 108 has a first part 101 having a width S supporting the pole 52 and contiguous intermediate leg portion 54 of each magnetic core portion 14 of the multichannel structure. Previously mentioned longitudinal parallel grooves 99 are machined into the first portion 101, to form core slots extending inwardly from a planar surface 103. A second part 105 of side piece 108 has a planar surface 107 parallel with planar surface 103 and recessed with respect thereto to allow flexing of the unsupported rear leg portion 56 as it will be described below. The surfaces 103, 107 are substantially parallel with the transducing gap plane 21 of the multichannel transducer assembly, formed by the respective end faces 26, 34 and 38 of each core portion 14. Parallel grooves 100 interposed between the shield slots 99 are machined inwardly of surface 107 in a well known manner. These grooves 100 serve as the previously mentioned shield slots. Consequently, the shield slots separate the first part 101 of the side piece 108 into a plurality of parallel rectangular blocks 130, each block comprising a groove 99 for supporting a magnetic core portion 14 in the above-described manner. It is seen from FIGS. 5 and 6 that in accordance with the teachings of the invention, the rear legs 30 and 56 are not supported by the first part 101, and extend over the recessed surface 107 of the second part 105 of the respective side pieces 106, 108, to allow flexing of these legs 30, 56.

The plurality of magnetic core portions 12, 14 is respectively placed in grooves 98, 99 in precise alignment and rigidly held in place within the respective side pieces 106, 108, for example, by a compound of epoxy resin, as it is well known in the art. The respective end faces 24, 32 and 36 of core portions 12 and end faces 26, 34 and 38 of core portions 14 are precisely lapped and polished, respectively, to form a transducing gap plane 21, utilizing techniques well known in the art. Nonmagnetic transducing gap material, for example, mica, is placed on the lapped and polished transducing gap surfaces of at least one half assembly as well known in the art. Alternatively, the transducing gap may be formed by vacuum deposition of $SiO_2$ or by sputtering of glass, on the pole faces 24, 26, while the respective end faces 32, 34, 36, 38 of the back core legs 28, 54, 30, 56 are suitably masked to prevent deposition of the transducing gap material thereon as it is known in the art. The resulting thickness of the transducing gap material 20 between abutting end faces 24, 26 of poles 48, 52 may be in the order of 500 microinches depending on the requirements of the particular application.

In the preferred embodiment of the multichannel transducer FIGS. 3 to 6, the back core leg 28, 54 of each channel is utilized for recording and leg 30, 56 for playback. Accordingly, each coil 112, 114 represents one-half of a recording winding and each coil 102, 104 one-half of a reproducing winding. In accordance with the preferred embodiment of FIG. 5, separate prewound coils 112, 114 are placed on each recording leg portion 28, 52 and similarly, separate prewound coils 102, 104 on each playback leg portion 30, 56, prior to bringing together the respective half assemblies 94, 96 of the multichannel transducer assembly 92. As best shown in FIG. 2 and 6, the respective leg portions 28, 54, 30, 56 are tapered to facilitate insertion of coils on these legs, as it is well known in the art. Each half assembly 94, 96 has a terminal board 116, 117 respectively attached thereto. The respective terminals of coils 102, 112 are connected to terminal board 116 and terminals of coils 104, 114 to terminal board 117. After the half assemblies are brought together with the core portions 12, 14 abutting at the transducing gap plane 21 as it will be described below, coils 112 and 114 are connected in series to form a recording winding and analogously coils 112 and 114 are connected in series to form a playback winding by interconnecting corresponding coil terminals on the terminal boards 116, 117 as it is well known in the art.

The corresponding half assemblies 94, 96 of the multichannel transducer are brought together with the corresponding core portions 12, 14 in juxtaposition, having the respective end faces 24, 26; 32, 34; and 36, 38; of each half assembly precisely aligned in a confronting relationship and having the respective shield slots 100 in precise registration. The thusly assembled half assemblies are clamped together, for example, by means of a suitable fixture, as well known in the art, and therefore not shown in the drawings. Carefully controlled pressure is applied as shown by arrows 64, 68, in a direction substantially perpendicular to the transducing gap plane 21. The pressure is slowly increased until sufficient closure of the transducing gap 20 and of the respective gaps between the end faces 32, 34; and 36, 38 is obtained. It will be understood that the applied pressure must be maintained below that necessary to change substantially the magnetic characteristics of the core members.

It follows from the foregoing disclosure that when pressure 64, 68 is applied, the rear leg portions 30, 56 are allowed to flex in respective directions 60, 62 generally opposite to the direction of the applied pressure, as it has been described previously with reference to FIG. 2. Consequently, corresponding end faces 32, 34 of the plurality of intermediate leg portions 28, 54 and end faces 36, 38 of the plurality of rear leg portions 30, 56 are brought together respectively, to form a plurality of uniform intimate contacts thus eliminating the undesirable spacing due to the previously described wedge effect between the respective leg portions.

While side assemblies 94, 96 are being held and pressed together as above described, interchannel magnetic shields 126 are inserted in the precisely matched shield slots 100 as it is shown in FIG. 3. The shields 126 are preferably made of mumetal-copper laminations. FIG. 4 shows a fragmentary view of a portion of the shield slots 100 and core slots 98 with only some of the shields 126 and cores 12, 14 inserted, respectively, for better clarity. While held under pressure, the multichannel transducer assembly is bonded with epoxy and cured, as it is well known in the art. For example, a bonding material of the type Epon Resin 815 manufactured by Shell Corporation may be utilized, mixed with U-Hardener in ratio 5:1 and glass beads between 25% and 50% of the total volume may be added thereto as a filler, as it is known in the art. Bonding conditions are directed by the manufacturer.

After the bonding process the outside pressure 64, 68 applied by the previously mentioned known fixture, is removed. However, in the resulting transducer structure the corresponding magnetic core portions 12, 14 remain pressed together by the surrounding cured epoxy compound with the rear legs flexed as described before. As it is shown in FIG. 5, the epoxy fills the spaces 86, 88 adjacent to the flexed rear leg portions 30, 56. Consequently a firm support is provided for the rear leg portions 30, 56 not supported by the side pieces 70, 72, thus yielding a rigid multileg multichannel transducer structure in which undesirable gaps in the back core are eliminated.

After the epoxy has been cured the multichannel transducer of the invention may be contoured to obtain a desired transducer-to-magnetic medium interface as it is well known in the art.

The multichannel transducer of the preferred embodiment may be utilized either for recording or for playback, as previously mentioned with respect to U.S. Pat. No. 3,881,194. For example, when selected or all the channels of the multichannel transducer 92 are utilized for recording, the respective playback windings 102, 104 of these channels may be shorted to prevent an appreciable magnetic flux to flow through the playback leg 30, 56. Similarly, when selected or all the channels of the transducer assembly 92 are utilized for playback, the recording coils 112, 114 of these channels may be shorted to prevent appreciable magnetic flux to flow through the recording legs 28, 54.

In the preferred embodiments of FIGS. 2 to 6 the magnetic transducer core 12, 14 is shown as having a reproducing leg 30, 56 of a smaller cross section with respect to the recording leg 28, 54. The latter feature provides a higher recording efficiency in the recording mode since leg 30, 56 represents a greater reluctance to the recording flux and consequently, it is "decoupled" more efficiently during recording. The trade-off, however, is less efficiency in the playback mode.

It will be understood by those skilled in the art that the invention is not limited to a transducer embodiment having only two back core legs, as it has been described above. For example, three or more back core legs may be utilized in a single channel or multichannel transducer in accordance with the invention, for example, as erase legs carrying erase windings for use in an erasing operation mode while the other legs may be gated as known from the above-indicated patent. In case three or more back core legs are utilized, the above-disclosed side pieces in accordance with the invention are extended to support all the respective intermediate leg portions, however, the rear leg portions most distant from the poles will stay unsupported to allow flexing as above disclosed. As a result, all the respective end faces of the poles and of the back core leg portions utilized will provide an intimate contact thus eliminating unwanted gaps.

It will be appreciated with respect to the foregoing disclosure that in a multichannel transducer in accordance with the invention the uniformity of channel-to-channel recording and reproducing characteristics is significantly improved.

While preferred embodiments of the invention have been described above and are illustrated in the drawings, it will be appreciated that a number of alternatives and modifications may be made which will fall within the scope of the appended claims.

I claim:

1. A magnetic transducer assembly having at least one pair of poles defining a transducing gap and a multiple leg back core contiguous with the poles, each leg providing a separate flux path, the assembly being supported by a nonmagnetic core holder, comprising in combination:
   (a) at least one magnetic core having two corresponding core portions made of a generally flexible magnetic material, each core portion comprising a pole and at least two leg portions contiguous with the pole, said pole and leg portions having smoothly lapped end faces defining a transducing gap plane;
   (b) a nonmagnetic core holder having two corresponding side pieces each supporting one of said two corresponding magnetic core portions at the pole and intermediate leg portions, while a rear leg portion most distant from said pole is unsupported by said holder; and
   (c) the corresponding magnetic core portions being held in juxtaposition with corresponding end faces in registration at the transducing gap plane and with a transducing gap material disposed between said poles, said corresponding magnetic core portions being pressed together at said poles and intermediate leg portions supported by said core holder in a direction substantially normal to and towards said transducing gap plane while said rear leg portions unsupported by said core holder flex in a substantially opposite direction.

2. The magnetic transducer assembly of claim 1 wherein each said side piece has a first part supporting said magnetic core portion and a second part recessed with respect to said first part and extending adjacent to said flexed rear leg portion.

3. The magnetic transducer assembly of claim 2 wherein said first part and said second part each has a planar surface substantially parallel with said transducing gap plane.

4. The magnetic transducer assembly of claim 3 wherein said first part further comprises a longitudinal groove extending inwardly from said planar surface thereof and in a direction parallel with respect to said transducing gap plane for supporting said magnetic core portion.

5. The magnetic transducer assembly of claim 1 having two back core legs, wherein each magnetic core portion has an intermediate leg portion supported by the nonmagnetic holder for receiving a low impedance recording winding and a rear leg portion unsupported by the nonmagnetic holder for receiving a high impedance reproducing winding.

6. The magnetic transducer assembly of claim 5 wherein said rear leg portions have a smaller cross section relative to said intermediate leg portions.

7. The magnetic transducer assembly of claim 1 wherein each said corresponding core portion is made of a laminated piece of generally flexible magnetic material.

8. The magnetic transducer assembly of claim 7 wherein said corresponding core portions are made of mumetal laminations.

9. The magnetic transducer assembly of claim 1 comprising a plurality of transducing channels, wherein each said side piece has a plurality of first corresponding parallel grooves for supporting a plurality of spaced magnetic core portions and a plurality of second corresponding parallel grooves interposed with respect to said first grooves for supporting a plurality of interchannel shields.

10. The magnetic transducer assembly of claim 1 wherein said corresponding core portions and side pieces are integrally joined together by means of a bonding material and wherein said bonding material provides support to said flexed rear leg portions.

11. A multichannel magnetic transducer assembly having a plurality of closely spaced parallel transducing channels, each channel comprising a magnetic core with poles defining a transducing gap and a multiple leg back core contiguous with the poles, each leg providing a separate flux path, the magnetic cores being supported by a nonmagnetic core holder, comprising in combination:

(a) a plurality of spaced magnetic cores each having two corresponding core portions made of a generally flexible magnetic material, each core portion comprising a pole and at least two leg portions contiguous with the pole, each said pole and leg portion having smoothly lapped end faces defining a transducing gap plane;

(b) a nonmagnetic core holder having two corresponding side pieces, each side piece having a plurality of corresponding first parallel grooves supporting a plurality of said corresponding core portions at the pole and intermediate leg portions, while a rear leg portion most distant from said pole of each corresponding core portion is unsupported by said holder; and (c) each said two corresponding magnetic core portions of said plurality of magnetic cores being held in juxtaposition with said corresponding end faces in registration at the transducing gap plane and with a transducing gap material disposed between said poles, said corresponding magnetic core portions being pressed together at said poles and intermediate leg portions supported by said holder in a direction substantially normal to and towards said transducing gap plane while said rear leg portions unsupported by said core holder flex in a substantially opposite direction.

12. The multichannel magnetic transducer assembly of claim 11 wherein each said corresponding side piece has a first and a second planar surface substantially parallel with said transducing gap plane, said plurality of corresponding first parallel grooves extending inwardly of said first planar surface, and said second planar surface being recessed with respect to the first planar surface and extending adjacent to said flexed rear leg portions unsupported by said side piece.

13. The multichannel magnetic transducer assembly of claim 12, wherein said second planar surface further has a plurality of corresponding second grooves parallel with said first grooves and interposed with respect thereto for supporting a plurality of interchannel magnetic shields.

14. The multichannel magnetic transducer assembly of claim 11, wherein each magnetic core portion has two back core leg portions, an intermediate leg portion supported by the nonmagnetic holder for receiving a low impedance recording winding and a rear leg portion unsupported by the nonmagnetic holder for receiving a high impedance reproducing winding.

15. The multichannel magnetic transducer assembly of claim 14, wherein said rear leg portions have a smaller cross section relative to said intermediate leg portions.

16. The mutichannel magnetic transducer assembly of claim 11 wherein each said corresponding core portion is made of a laminated piece of generally flexible magnetic material.

17. The multichannel magnetic transducer assembly of claim 16 wherein said corresponding core portions are made of mumetal laminations.

18. The multichannel transducer assembly of claim 11 wherein said plurality of corresponding core portions and said corresponding side pieces are integrally joined together by means of a bonding material and wherein said bonding material provides support to said flexed rear leg portions.

* * * * *